June 2, 1936.  H. WHITE  2,042,815
DISPLAY APPARATUS AND OPTICAL SYSTEM
Filed June 27, 1933   7 Sheets-Sheet 1
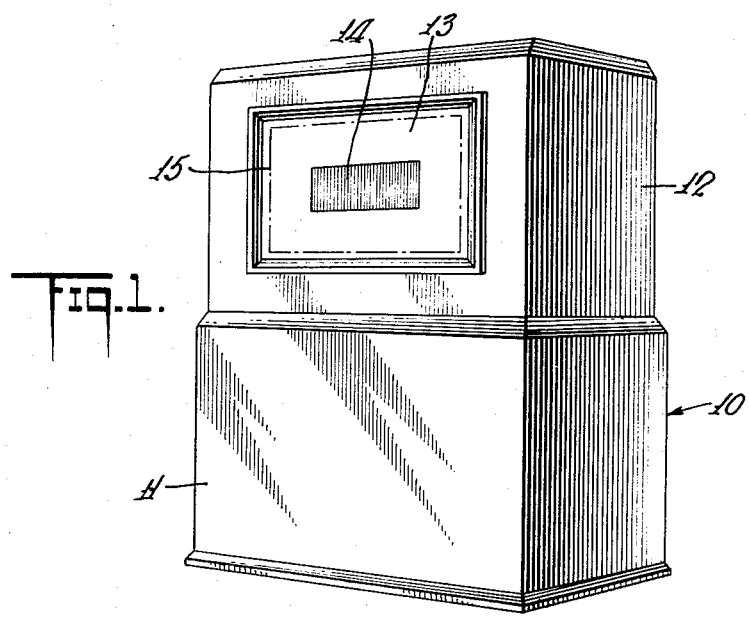
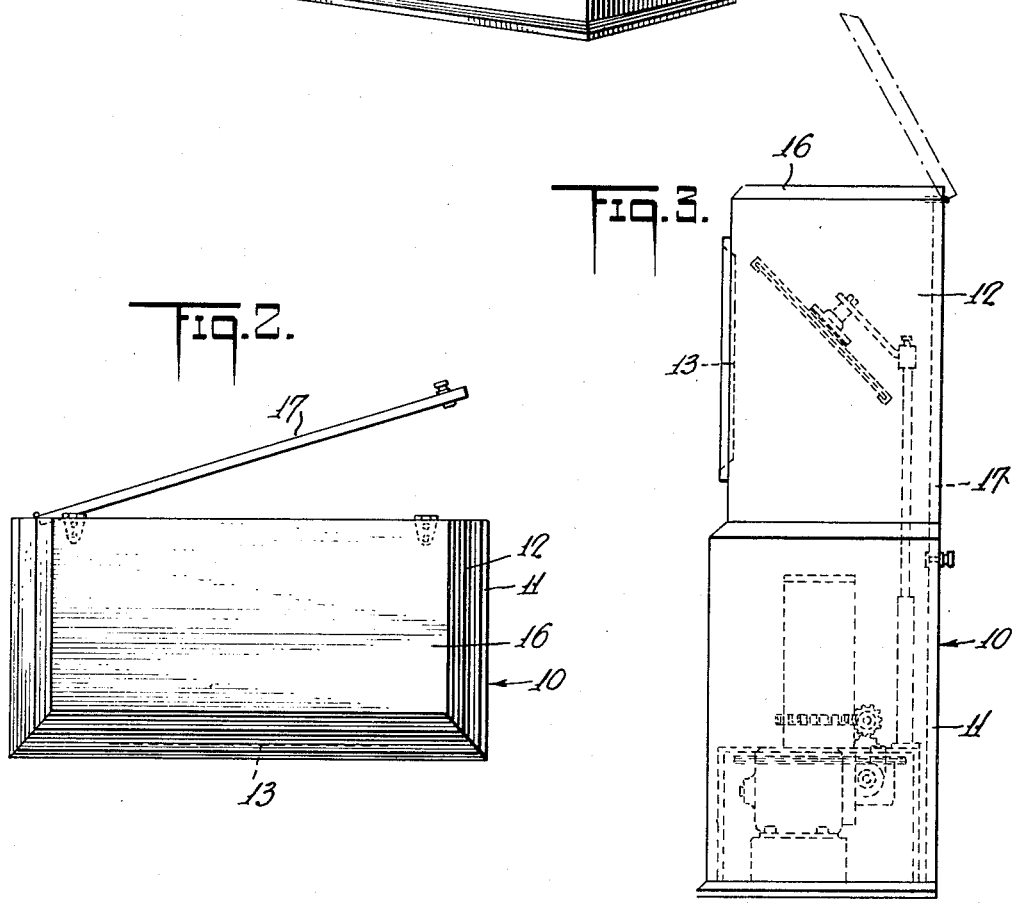
INVENTOR
*Henry White*
BY
ATTORNEYS June 2, 1936.  H. WHITE  2,042,815
DISPLAY APPARATUS AND OPTICAL SYSTEM
Filed June 27, 1933  7 Sheets-Sheet 2
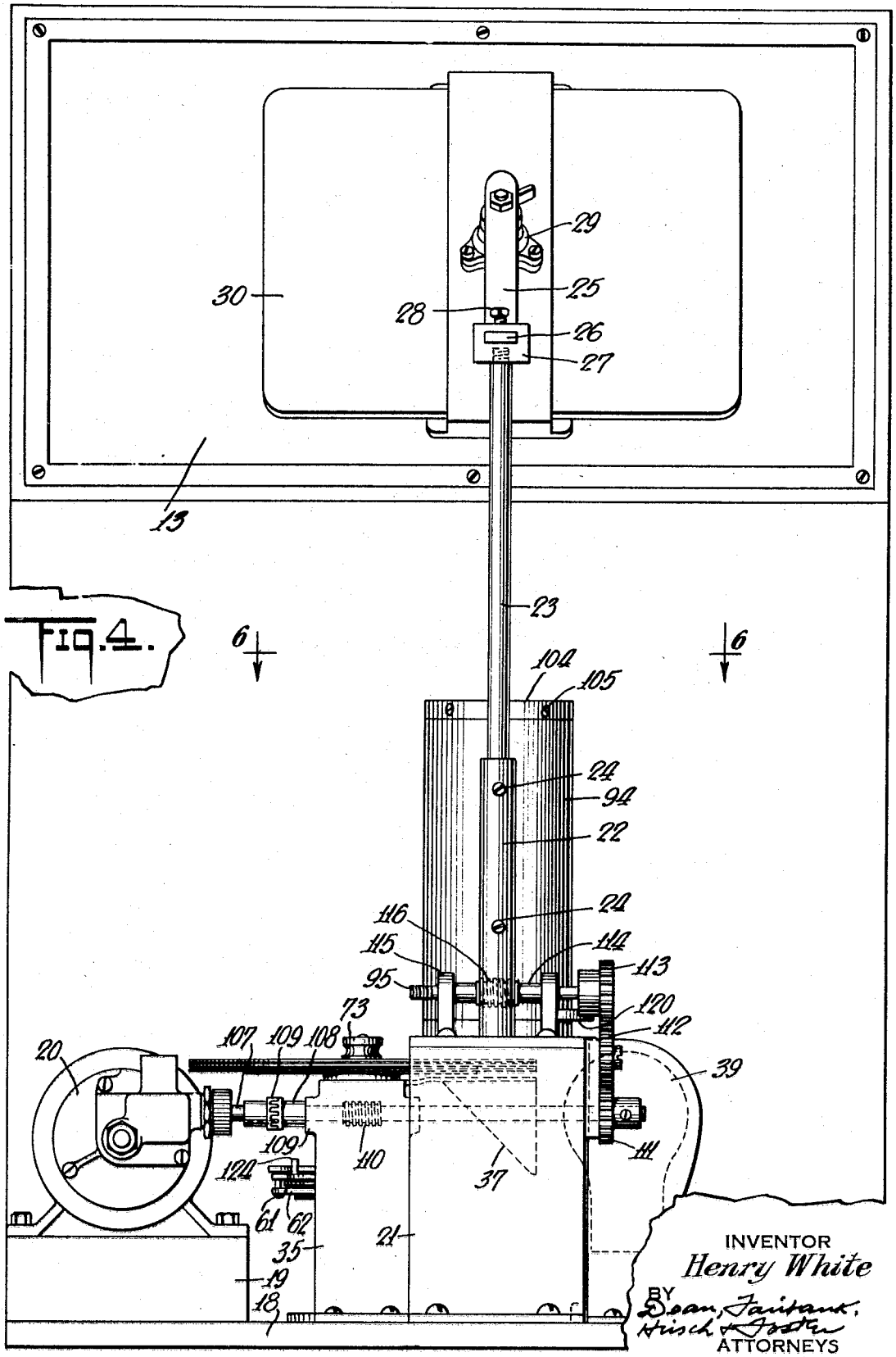

June 2, 1936.  H. WHITE  2,042,815
DISPLAY APPARATUS AND OPTICAL SYSTEM
Filed June 27, 1933   7 Sheets-Sheet 3
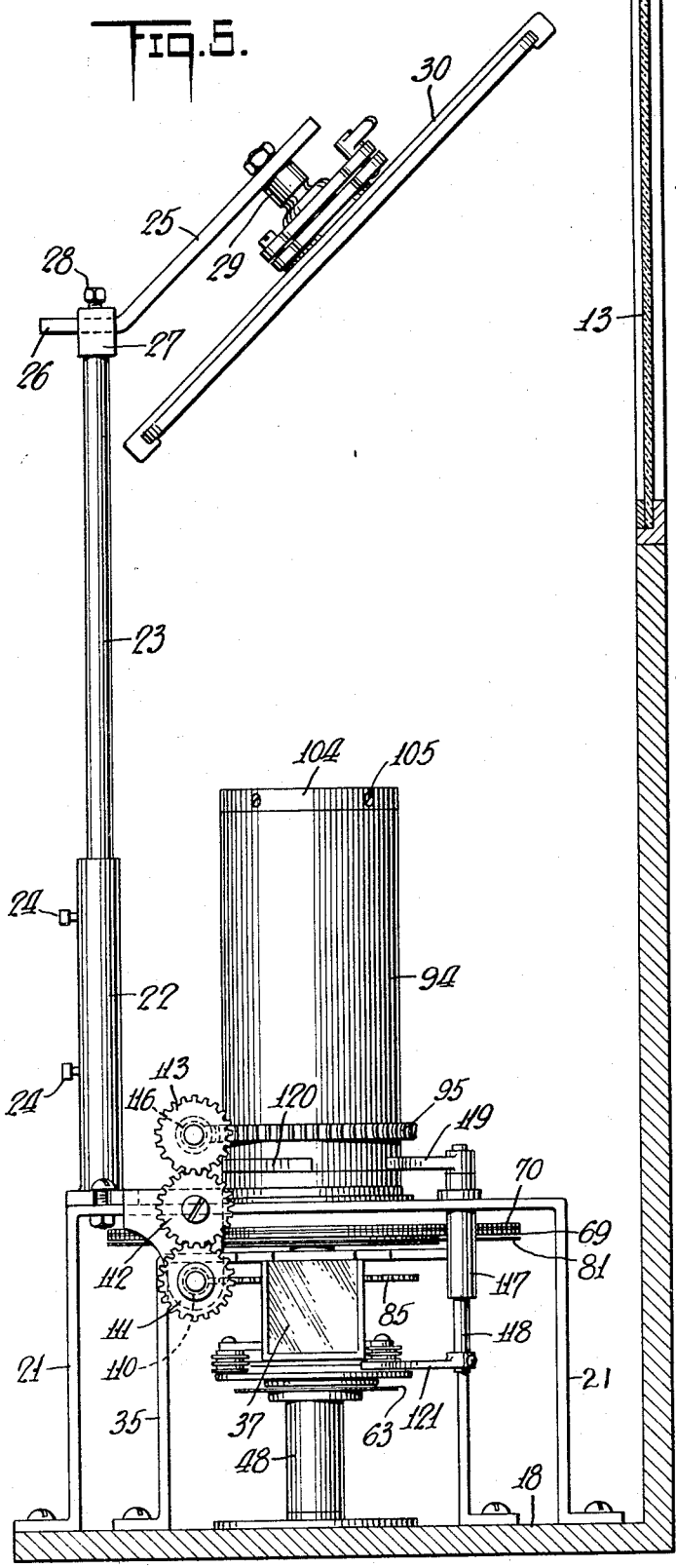
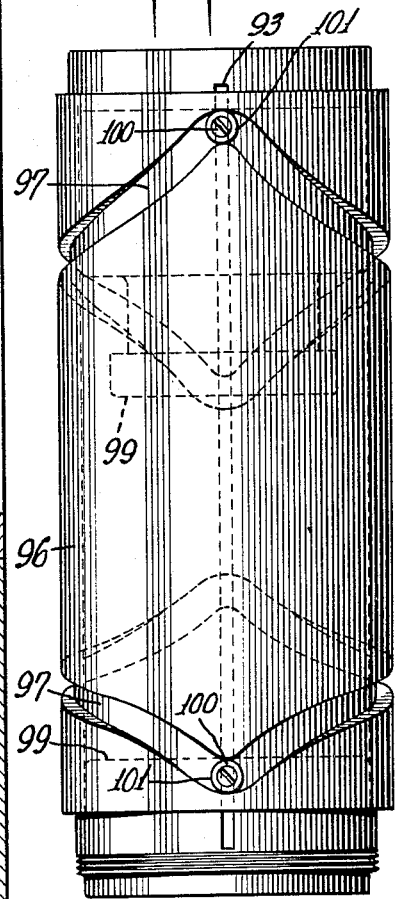
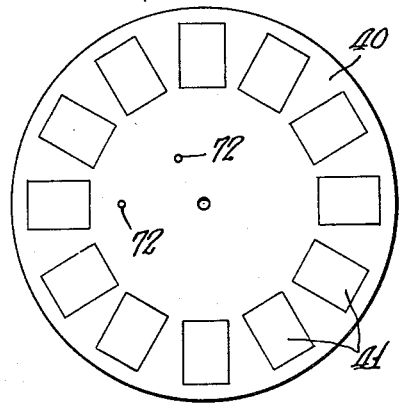
INVENTOR
Henry White
BY
ATTORNEYS June 2, 1936.  H. WHITE  2,042,815
DISPLAY APPARATUS AND OPTICAL SYSTEM
Filed June 27, 1933  7 Sheets-Sheet 4
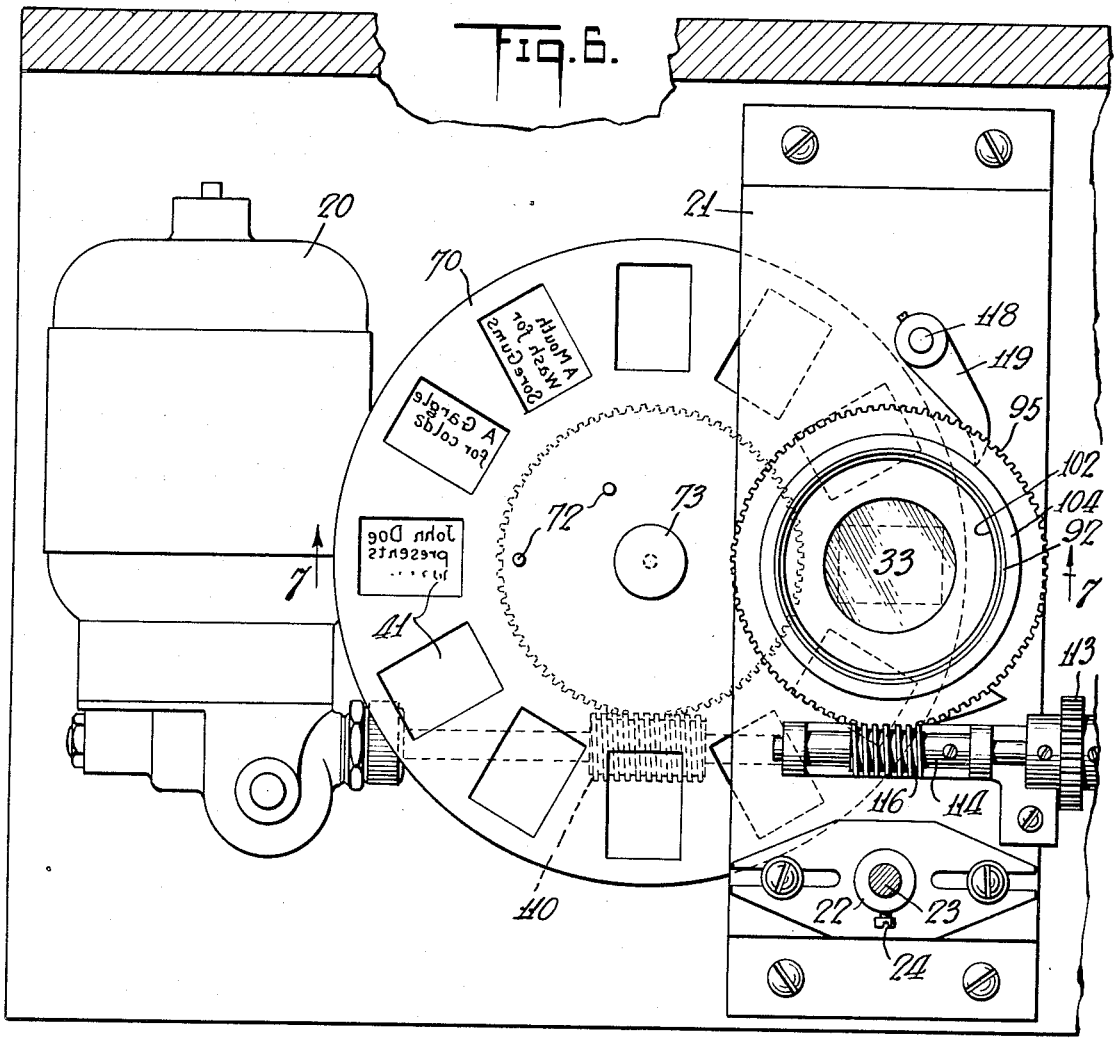
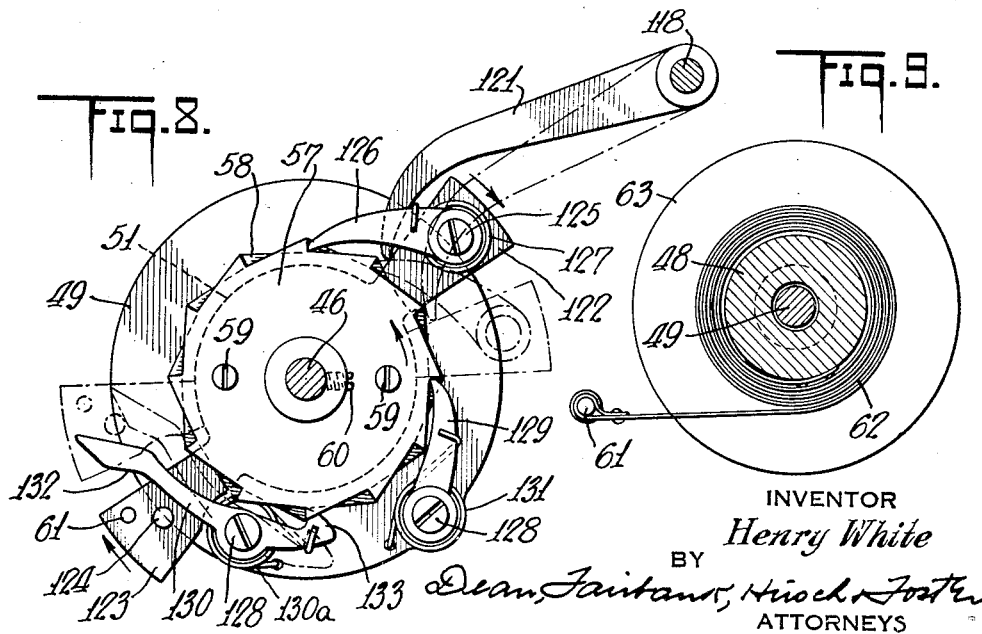
INVENTOR
*Henry White*
BY
*Dean, Fairbank, Hirsch & Foster*
ATTORNEYS

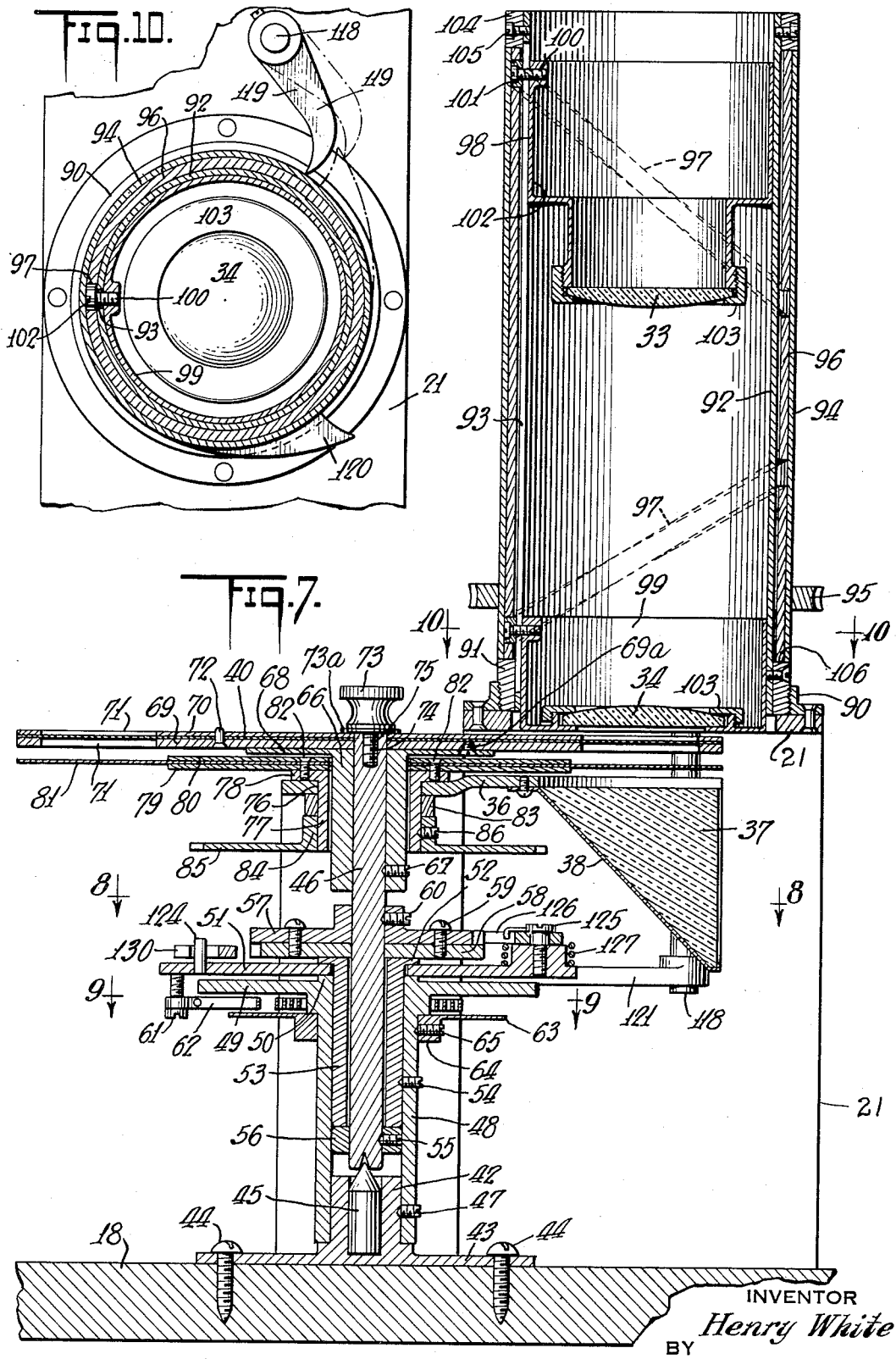

June 2, 1936.  H. WHITE  2,042,815
DISPLAY APPARATUS AND OPTICAL SYSTEM
Filed June 27, 1933 7 Sheets-Sheet 6

INVENTOR
Henry White
BY
ATTORNEYS

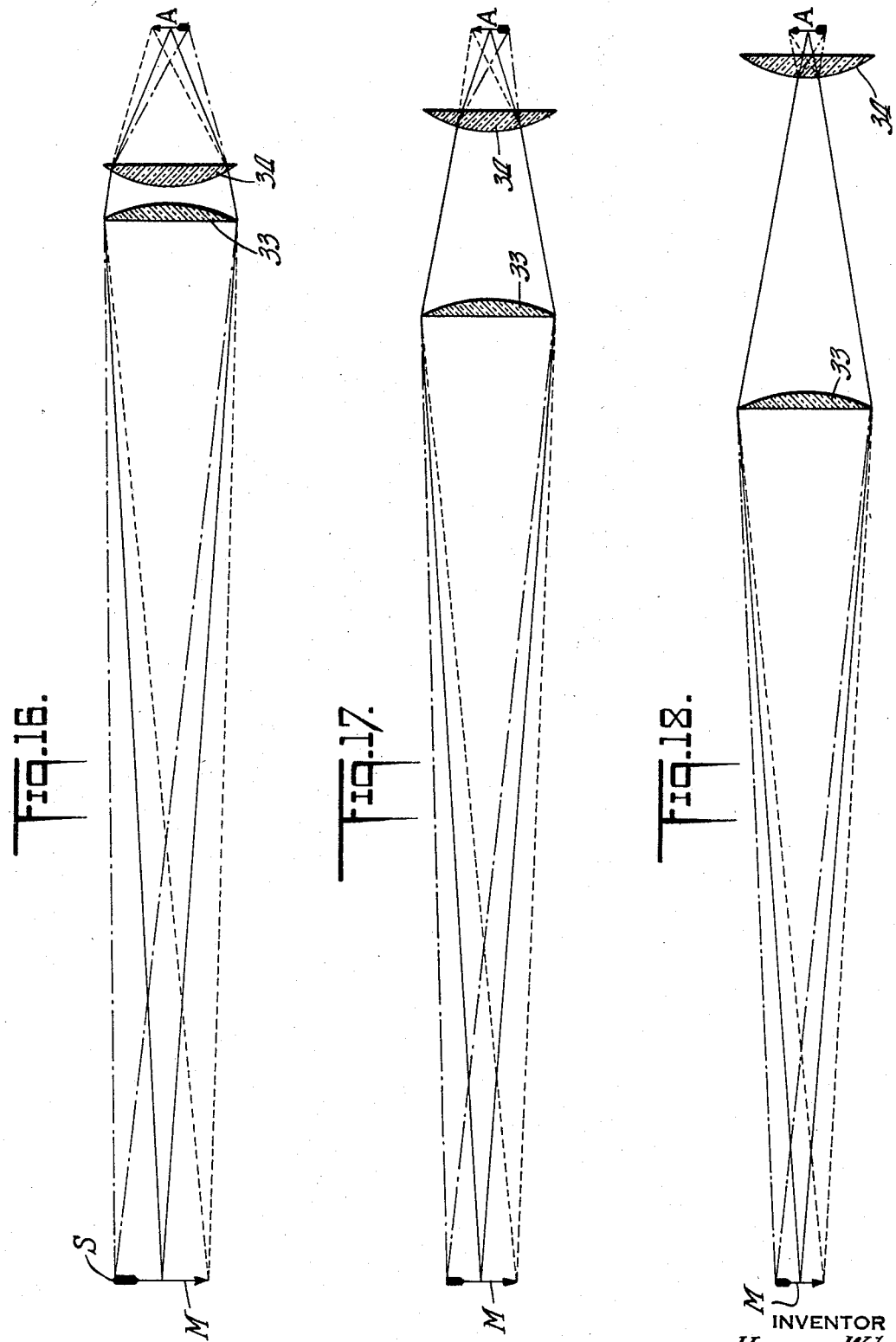

Patented June 2, 1936

2,042,815

UNITED STATES PATENT OFFICE 2,042,815

DISPLAY APPARATUS AND OPTICAL SYSTEM

Henry White, New York, N. Y., assignor, by mesne assignments, to Lester Hofheimer, New York, N. Y.

Application June 27, 1933, Serial No. 677,842

9 Claims. (Cl. 88—27)

My present invention considered from one aspect relates to the provision of a display apparatus, particularly intended for advertising purposes and of the type in which an image of the object to be displayed is projected upon a screen.

More particularly, the invention relates to a device of this character in which the size of the image on the screen is continuously varied while maintaining the image in proper focus at all times. By the simple expedient of continuously or intermittently varying the size of the image, the observer obtains an illusion of motion which compels observation of the display sign. The optical effect produced by projecting a small image on the screen and then progressively magnifying it until it nearly covers the screen is quite similar to the optical effect which would be produced if the image were actually moved toward the observer and of course the reverse is true when the fully magnified image diminishes in size.

Another object of the invention is to provide an automatically operated display sign of this character in which the images of a plurality of advertising or display devices are successively projected on the screen and caused to vary in size. A typical method of operation is to project an image without substantial magnification which is then enlarged until the limit of magnification is reached and then gradually reduced to its original size whereupon another object is shifted into the path of the projecting apparatus and a similar treatment of the image is effected on the screen.

Another object of the invention is to accompany the continuous or intermittent magnification or diminution of the image with an intermittently or continuously changing light modifying device designed to kaleidoscopically or otherwise variably color the image during the entire period of its projection.

Another object is to provide apparatus of the character above noted in which the screen itself may form part of a relatively compact box or casing which may be mounted upon a store counter or in a store window and with all the mechanism contained within the box save only the projecting wire and attachment plug for connecting the driving motor of the mechanism to the source of current.

As suggested in the preceding object, the apparatus is preferably fully automatic in operation, the image magnification and reduction, the color variation and substitution of one object for another being accomplished entirely through continuously or intermittently acting motor driven means.

Insofar as the display sign phase of the invention is concerned it will be apparent that it is in large measure independent of the particular optical system used for enlarging and ensmalling the image. I prefer to use for this purpose however, an entirely novel optical system which is capable of many uses other than effecting the projection, magnification and diminution of an image on a screen.

Another object of the invention therefore is to provide an optical system in which the magnification or diminution of the image of an object may be effected without varying the distance between the object and the image and while always keeping the object in focus. Such a system of course finds a wide field of usefulness in connection with photographic and telescopic apparatus and eliminates the need for the double adjustments usually required, one to effect magnification and the other to adjust the focus.

In accordance with a preferred embodiment of the invention, the optical system includes a pair of reciprocally compensating lenses simultaneously movable toward or away from each other and means for synchronizing the relative movement of the lenses with respect to each other along a common axis. These lenses are disposed between the object and the image and interlocked to compel simultaneous movement thereof. The relative rates of movement of the lenses toward or away from each other is so automatically predetermined that the image of the object may be magnified or reduced in size by effecting relative advance or separation of the lenses yet remains always in focus.

It should be understood at the outset that the relative rates of movement of the lenses to effect the reciprocal compensation desired will depend upon the nature of the lenses themselves which may be identical or may have different optical characteristics. In the sign apparatus the optical characteristics of the two lenses being known, their relative rates of movement may be conveniently calculated and a cam or equivalent mechanism designed for shifting one lens fairly rapidly in one direction as the other is shifted fairly slowly in the other direction to effect the requisite reciprocal compensation and to keep the image always in focus regardless of the extent of magnification.

Another object of the invention is to provide an apparatus of the above type in which a plurality of objects such for instance as ordinary picture films may be successively and intermittently interposed between the source of light and the lens system and in which a light modifying means is interposed between the source of light and the film, such modifying means being preferably driven by the film shifting and lens operating mechanism, but arranged to present a constantly varying color effect on the projected film.

A more specific object is to provide a novel form of color filter in which a continuous shower of colored particles gives a kaleidoscopic effect. In any event it is preferred that while the color controlling mechanism be driven from the same means which actuates the lenses and the object carrying means, there shall be no true synchronization between the coloring means and the other moving parts of the apparatus so that a continuously changing color effect is at all times produced.

Another object of the invention is to provide a special type of image carrying film preferably in the nature of a disk having a plurality of radially disposed film frames near its periphery and equipped with means for mounting and centering it with respect to a carrier device. The use of such a disk like film with the images to be projected near its periphery permits the ready interchange of other film disks bearing other pictures to be displayed. It may permit the store keeper using the display device to select any suitable film disk for advertising a particular product in which he may be specializing or it may permit the lessor of the display machines to supply his lessees with new films at regular intervals.

Another object of the invention is to provide a display apparatus of simple, rugged, durable, compact, inexpensive construction, fully automatic and fool-proof in operation and so constructed that new display elements may be rapidly interchanged for the old ones.

The invention may be more fully understood from the following description in connection with the accompanying drawings wherein:—

Fig. 1 is a perspective view of a display cabinet embodying the invention,

Fig. 2 is a top plan view thereof,

Figure 13:
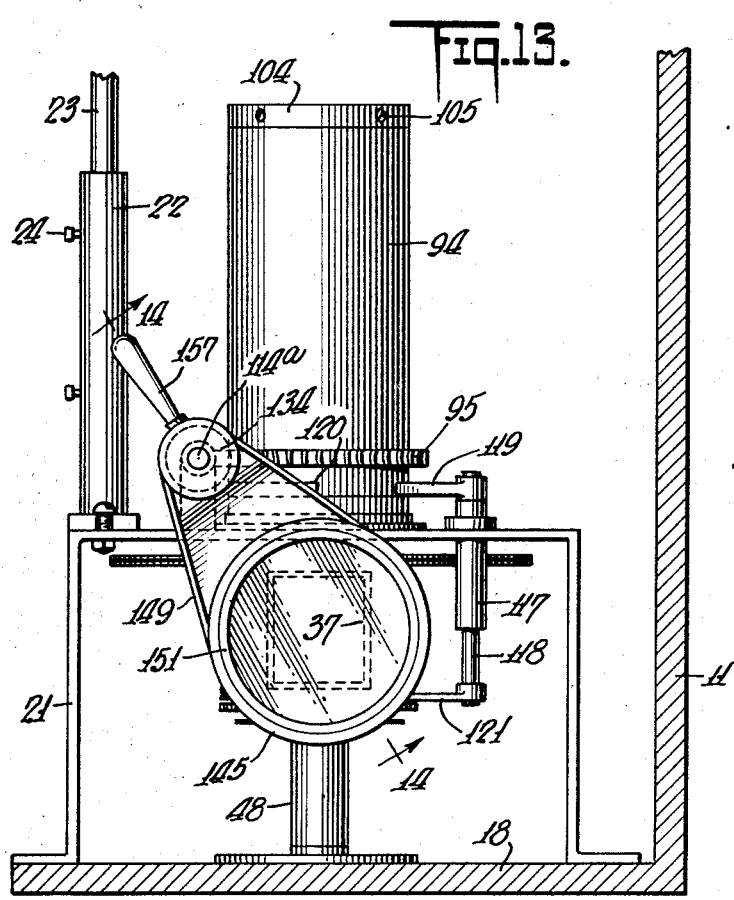

Fig. 3 is a side elevational view thereof showing the internal mechanism in dotted lines, Fig. 4 is a rear elevational view of the projecting mechanism, Fig. 5 is a side elevational view of the projecting mechanism, Fig. 6 is a sectional plan view on the line 6—6 of Fig. 4, Fig. 7 is an enlarged vertical sectional view on the line 7—7 of Fig. 6, Fig. 8 is a top plan view of the ratchet mechanism on the line 8—8 of Fig. 7, Fig. 9 is a sectional view on the line 9—9 of Fig. 7, Fig. 10 is a sectional view on the line 10—10 of Fig. 7, Fig. 11 is a side elevational view of the lens operating cam structure, Fig. 12 is a plan view of one of the replaceable film units, Fig. 13 is a side elevational view of a similar system utilizing a different type of kaleidoscopic light modifying means.

Figure 14:
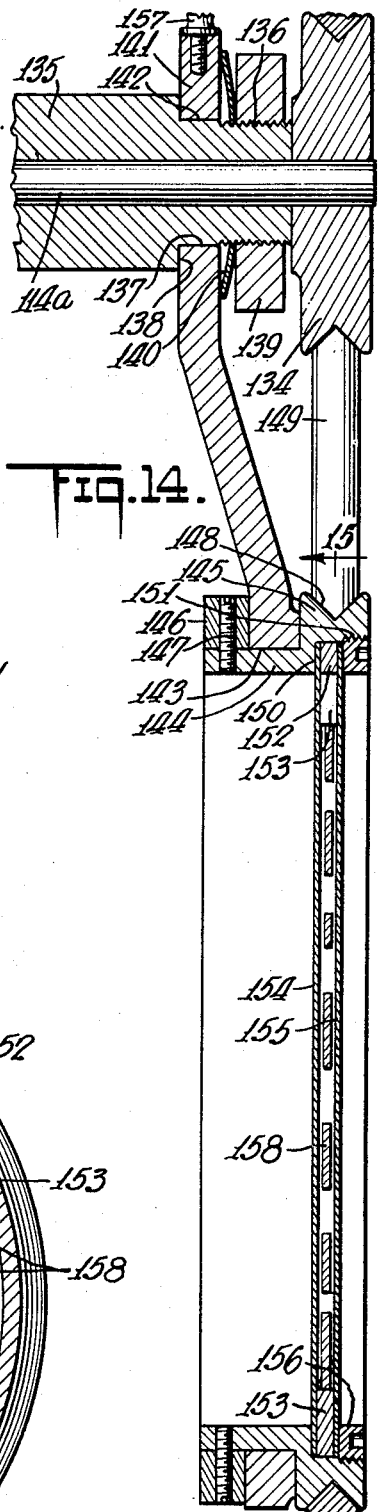
Figure 15:
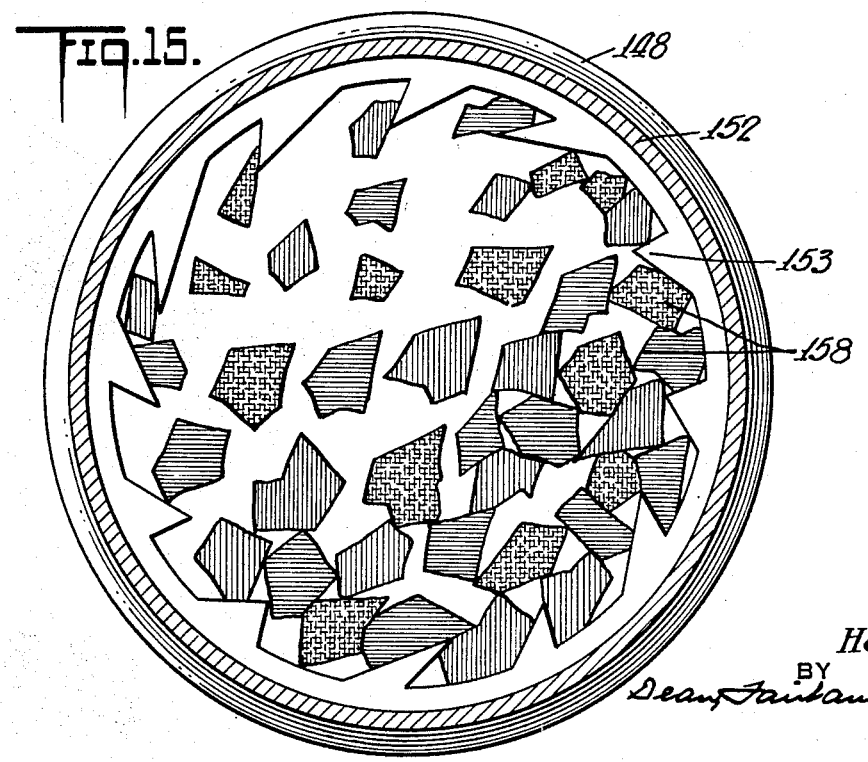

Fig. 14 is a greatly enlarged view on the line 14—14 of Fig. 13,

Fig. 15 is a vertical sectional view on the line 15—15 of Fig. 14, and

Figs. 16, 17 and 18 are diagrammatic illustrations of the operation of the optical system.

Referring first to Figs. 1, 2 and 3 of the drawings I have used the reference numeral 10 to designate a cabinet of generally rectangular shape having a somewhat enlarged lower portion 11 and a slightly reduced upper portion 12. Secured in the forward wall of the upper cabinet portion 12 is a screen 13. In Fig. 1 I have indicated at 14 the size of an image projected on the screen and in dotted lines at 15 the extent to which this image may be magnified while keeping it in focus.

In order to obtain convenient access to the mechanism within the cabinet, the latter is preferably provided with a hinged cover 16 and with a hinged back 17 so that the cabinet may be fully opened for purpose of inspection, repair or interchange of films.

It will be understood that the cabinet is merely typical of one convenient means for housing the display apparatus and mounting the screen and that various other types of cabinets might be used.

Referring now to Figs. 4 to 12 of the drawings, numeral 18 represents the bottom of the casing upon which is mounted a base 19 for an electric motor 20. Also mounted upon the bottom of the casing is an inverted U-shaped bracket 21 which at one corner mounts a hollow upstanding post 22 in which a standard 23 is vertically adjusted, the standard being locked in adjusted position by set screws 24. An angularly disposed arm 25 includes a tail piece 26 adjustably mounted in a block 27 fixed to the upper end of the standard 23 and carrying a set screw 28 for locking the tail piece in any desired position of adjustment. The free end of the arm 25 carries an adjustable mounting 29 for a mirror 30. This mirror is disposed above a vertical cylinder 94 also mounted on the bracket 21 in a manner to be later described and in which are axially movable, the reciprocally compensating lenses 33 and 34 (Fig. 7). The mirror is inclined approximately at a 45° angle so that the light passing through the lenses will be reflected from the mirror onto the screen.

A generally L-shaped bracket 35 also rising from the base 18 has its upper horizontally disposed arm provided with a projection 36 adapted to support a prism 37 of triangular cross section having a reflective backing 38. This prism transmits light from a light source 39 upwardly through compensating lenses 33 and 34. Means is provided for supporting a film disk 40 of the character shown in Fig. 12, between the prism and the lower lens 34 and for successively moving the radially disposed object carrying portions 41 of such film, into position for projection upon the screen.

An upwardly facing socket member 42 includes a flange 43 screwed or otherwise secured to the base 18. Within this socket member is an upwardly facing tapered bearing pin 45. Pin 45 serves as a thrust bearing for the lower end of a rotatable vertically disposed spindle or shaft 46 which as will be more fully hereinafter described, carries means for supporting the film and is operatively connected to a ratchet and pawl mechanism for intermittently effecting movement of the film.

Encircling the post 42 and secured thereto as by a set screw 47 is a hollow post 48 which near its top is provided with a relatively wide flange 49. Above the flange, the post 48 is provided with a narrow seat 50 to support an oscillatable circular member 51 having diametrically opposite radial extensions 122 and 123 (Fig. 8), this disk being restrained against upward movement by the outwardly extending flange 52 of a sleeve member 53, extending into the hollow post 48 and secured thereto as by a set screw 54. Fixed upon the lower end of the spindle 46 as by set screw 55 is a collar 56 restrained against upward movement by the lower end of the sleeve 53. Seating upon the flange 52 are a pair of superimposed ratchet wheels 57 and 58 similarly toothed but having their teeth facing in opposite directions and vertically aligned with each other. These ratchet wheels are secured together by screws 59 and are keyed to the spindle 46 by a set screw 60.

A stud 61 extending downwardly from disk projection 123 is anchored to one end of a coiled expansion spring 62, the other end of this spring being anchored by any suitable means (not shown) to the post 48 and the spring being substantially housed between the bottom of the flange 49 and a protective disk 63 having a hub portion 64 secured by set screw 65 to the post 48.

Above the ratchet wheels 57 and 58 a sleeve member 66 is secured as by set screw 67 to the spindle 46. A flange 68 at the upper end of the sleeve 66 is adapted to support the lower member of a pair of film clamping plates 69 and 70 between which the film 40 is disposed. Two plates 69 and 70 hold the film disk perfectly flat, restraining it against warping and are provided with openings 71 therein registering with the display frames 41 of the film disk. Preferably the lower film clamping plate 69 is rigidly secured to flange 68 by screws 69a and is provided with spaced upstanding studs 72 (Figs. 6 and 7) passing through registering openings in the film and in the upper plate 70. It will of course be understood that the two film clamping disks as well as the film itself are provided with center openings which slip over the spindle 46 and that the upper clamping plate is forced into clamping position by a nut 73 having a reduced threaded shank 74 screwed into a socket 75 in the top of the spindle 46. Washers such as 73a may be arranged under the knob 73 to compensate for slight vertical adjustments of the film clamping plates to bring the film into correct initial focus. Such adjustments are made permanent by resetting of the set screw 67.

From the foregoing description it will be seen that the film carrying disks are clamped tightly against the top of the sleeve 66 so that the sleeve, the film carrying elements, the shaft and the ratchet wheels 57 and 58 turn as a unit.

The upper horizontal portion of the L-shaped bracket 35 is provided with an opening 76 therein receiving a hub 77. This hub has a flanged upper end 78 to which are secured a pair of clamping disks 79 and 80 clamping between them a color modifier in the form of a translucent color disk 81 of greater diameter than the clamping disks. Disk 81 is of the same size as the film disk 70 and is secured together with its clamping members 79 and 80 by screws 82 to the flange 78 of the hub 77. The flange of the hub rests on the upper face of the bracket 35. An annular spacer 83 encircles the hub 77 between the bracket 35 and the hub 84 of a worm wheel 85, the latter being keyed to the hub 77 by a set screw 86.

Before describing the driving mechanism for this worm wheel which serves to continuously rotate color filter 81, or describing the intermittent pawl actuation of the ratchet wheels 57 and 58 which move the image carrying film, reference may be had to Figs. 5, 7, 10 and 11 for an understanding of the lens mounting and actuating means.

A threaded socket member 90 fixed upon the bracket 21 receives the lower threaded end of a collar 91 which is fixed to an upstanding cylindrical member 92 having a vertical slot 93 therein extending nearly from end to end thereof. An outer cylinder member 94 carries an annular worm gear 95 near its lower end and is fixed with respect to a cylinder 96 disposed between the sleeves 92 and 94. The sleeve member 96 is provided with cam grooves 97 and the carriages 98 and 99 for the lenses 33 and 34 are each provided with studs 100 working through the vertical slot 93 in the wall of the inner cylinder 92 and having rollers 101 on their outer ends travelling in the cam grooves 97.

The so-called lens carriages may be of any desired construction and typically include relatively long sleeve portions 102, inwardly turned portions of which coact with threaded collars 103 to clamp the lenses in position. The elongated sleeve members 98 and 99 minimize the danger of the lens carriages canting as they are shifted axially within the inner cylinder 92. It will be readily seen that as the cylinder 94 is rotated, the cylinder 96 will turn with it and since the lens carriages are restrained against rotation by the studs 100 which work in the vertical slot 93 of the fixed cylinder 92, the cam grooves will act through the rollers 101 to impart an axial movement to the two lens carriages thereby effecting relative advance or separation thereof.

As best seen in Fig. 11, each cam groove is continuous so that continuous rotation of the outer cylinder 94 operates to continuously move the lenses in relatively opposite directions. The rotatable sleeves 94, 96 which if desired might be made of a single piece of material, are restrained against upward movement by a collar 104 secured by screw 105 to the projecting upper end of the fixed sleeve 92. At their lower ends the rotatable sleeves 94, 96 have bearings upon a shoulder 106 of the collar 91.

Means is provided for continuously rotating the gear 95 and intermittently rotatably, advancing the film disk 40 one step after a complete cycle of movement of the lenses and continuously driving the light modifier or color screen 81.

The drive from the motor 20 to the worm gear 95 most clearly appears in Fig. 4. It will be observed that the motor shaft 107 is coupled to an axially aligned shaft 108 by a clutch 109. Shaft 108 has suitable bearings at 109 in the bracket 35 and carries a worm 110 meshing with the worm wheel 85 to effect continuous rotation of the light modifying disk 81. At the end opposite the clutch, shaft 108 has a pinion 111 fixed thereto. This pinion operates through an idler gear 112 to drive a pinion 113 fixed upon the end of a shaft 114, journalled in suitable bearing brackets 115, supported on a bracket 21. Shaft 114 carries a worm 116 in continuous engagement with the worm wheel 95 and operable to cause continuous uni-directional driving of the rotating composite cylinder 94, 96.

The means for actuating the ratchet and pawl mechanism to impart a step by step movement to the object carrying film 40 may be best seen in Figs. 5 to 10 inclusive. A vertical bearing sleeve 117 (Fig. 5) carried by the bracket 21 journals a rock shaft 118, this rock shaft at its upper end carrying a rocker arm 119 adapted to coact with a cam 120 fixed upon the sleeve 94. The manner in which this rocker arm is actuated by the cam is most clearly apparent from Fig. 10 of the drawings, the dotted line position of the cam and rocker arm showing the rocker arm swung outwardly and about to be released. On the lower end of the rock shaft 118 is a second rocker arm 121, the latter arm engaging the radial extension 122 of the plate 51. The opposite plate extension 123 mounts an upwardly extending stud 124. The function of the rocker arm 121 is to oscillate the element 51 against the action of its spring, thereby acting to store energy in the spring due to the connection of the stud 61 with the end of the spring.

Mounted upon the extension 122 is a pivot pin 125 for a driving pawl 126, this pawl being urged into engagement with the teeth of the upper ratchet wheel 57 by a coiled spring 127.

Fixedly mounted upon and projecting upwardly from the fixed flange 49 are a pair of studs 128, 128 adapted to serve as fulcrums respectively for pawls 129 and 130. Pawl 129 is urged by a spring 131 into engagement with the teeth of the upper ratchet wheel 57 and its sole function is to block retrograde movement of the ratchet wheels. The pawl 130 is pivoted intermediate its ends on the stud 128 and has its hooked detent end 133 urged against the lower ratchet wheel 58 by spring 130a. Its purpose is to prevent overthrow or overrunning of the connected ratchet wheels by the spring urged driving pawl 126. It will be understood that each of the ratchet wheels 57 and 58 have a similar number of teeth but that the teeth of the two wheels are oppositely disposed and have their radially disposed working faces in alignment with each other.

The operation of the pawl mechanism may be followed through in Fig. 8. The full line position of the pawls shows them in their normal position of rest and the full line position of the crank arm 121 shows it in its normal position of rest and uninfluenced by the cam 120. As the cam 120 engages the rocker arm 119 it swings the rocker arm 121 from the full line to the dotted line position of Fig. 8 thereby shifting member 51 and its extensions 122 and 123 from the full line to the dotted line position. During this movement stud 61 has been moved in a clockwise direction to tension the driving spring 62 and the pin 124 has engaged a cam face 132 on the tail of the pawl 130 to shift the hooked detent end 133 of this pawl out of engagement with the teeth of the lower ratchet wheel 58 and against the action of the spring 130a. Also during this movement the driving pawl 126 has been shifted from its full line to its dotted line position; in other words it has been moved a full tooth and dropped into driving engagement with the next tooth of the upper ratchet wheel.

As the rocker arm 119 rides over the peak of the cam 120 a rapid spring snap action occurs to shift a new picture 41 into position between the light source and the lenses 33, 34. This action is as follows:—Member 121 opposes no resistance to counter-clockwise movement of the member 51 under the influence of the driving spring 62. This member therefore starts to travel in a counter-clockwise direction and the driving pawl 126 starts to advance the two connected ratchet wheels with respect to which the film clamping plates 69 and 70 are rigidly affixed. Before the pawl 126 has completed its advance of the composite ratchet wheel structure however, the cam 132 on the tail piece of the lever 130 will have been released by the pin 124 and the hooked detent end of the pawl 130 will be swung by spring 130a against the lower ratchet wheel 58 in a position to positively block further movement of the composite ratchet wheel after pawl 126 has advanced one tooth. When this one tooth advance has been completed the pawl 129 will have again snapped behind a new tooth and the pawls 130 and 129 will be retaining the composite ratchet structure against rotation in either direction until the cam 120 again acts on the rocker arm 119.

During the time that the new image to be projected upon the screen is held stationary, the cylinder 94 will make one complete revolution, gradually magnifying the image on the screen from the size indicated at 14 (Fig. 3) to the size indicated at 15 and then gradually reducing the image to the size indicated at 14, whereupon another object film will be snapped into position and the cycle of lens movement repeated.

It is worthy of note that while the present system is designed to first project the film in small size and then effect a complete magnification and compete reduction of the image, it is within the scope of my invention to resort to numerous variations of this general idea. A typical variation would be to project a small image of the forward end of a vehicle upon the screen, increase the size of this image so that the vehicle appeared to be approaching the observer and then shift a new film into place depicting the rear end of the vehicle and by reducing the image, create the illusion of this vehicle moving away from the observer. In other words the mere addition of cams corresponding to cam 120 would cause shifting of the object carrier any suitable number of times during a single revolution of cylinder 94.

The purpose of utilizing such a precise and accurate ratchet mechanism for the quick shifting of films and positive locking of films during the projection thereof is necessitated by the fact that the pictures are small as compared to the size of the screen upon which they are projected and any movement of these films during the projection or magnification or demagnification or any misalignment of the film in the first place would seriously impair the effectiveness of the display.

In Figs. 13 to 15 inclusive I have illustrated another mechanism for coloring the image, this mechanism being more particularly designed to produce a kaleidoscopic color effect on all of the translucent or transparent parts of the image. In Fig. 13 some parts of the driving mechanism and actuating mechanism for the lenses and the picture carrying film have been omitted for the sake of clarity. In this figure, 134 represents a pulley secured upon an extension 114a of the shaft 114 illustrated in Figs. 4 and 6. Shaft end 114a is encircled by a sleeve 135 having a reduced end 137 cooperating with the sleeve proper to afford a collar 138 and having a threaded extremity 136 upon which a nut 139 is adapted to be screwed. This nut lies between the pulley and a spring washer 140 and by adjusting the nut the tension of the washer upon a yoke member 141 may be increased or decreased. The reduced upper end of this yoke is apertured as at 142 to fit over the unthreaded reduced end of the sleeve 135 and the yoke proper is extended in the form of a relatively large eye 143 within which is rotatably mounted a collar 144, said collar having an integral annular flange 145 at one edge and having a ring 146 pinned as at 147 to its opposite edge so that it is confined against axial movement within the eye 143.

Flange 145 is grooved as at 148 to receive the endless flexible driving belt 149 which runs around the pulley 134 at the end of the shaft extension 114a. The flange 145 is also provided with an internal annular recess 150 therein and outwardly beyond the recess, with a second internally threaded and slightly enlarged threaded recessed portion 151. A wheel 152 having a set of irregularly shaped internal teeth 153 is confined between a pair of transparent circular plates 154 and 155. The plates and the wheel are shaped to fit within the recess 150 and held in position by a clamping ring 156 screwed into the threaded recess extension 151.

A handle member 157 is affixed to the yoke 141 at the side of the shaft 114a remote from the eye 143. With this handle the entire yoke structure and the rotatable ring 144 which it carries may be swung about the shaft 114a as a center without varying the centers of the pulleys 145 and 134. The spring washer 140 of course frictionally holds the parts in any position to which they may be shifted by the handle. The purpose of the shifting is to permit swinging of the color modifying device out of the path of travel of the light passing from the source to the prism thereby permitting either white light or kaleidoscopically colored light to be used at will.

A plurality of translucent colored fragments 158 which may for instance be bits of vari-colored broken glass, are confined within the wheel 152 by the plates 154 and 155. The teeth 153 of the wheel are arranged at such angles with respect to the periphery of the wheel or with respect to the radii of the wheel that as the wheel travels in a counter-clockwise direction (Fig. 15) the particles will be picked up by the teeth, some of them dropped at one point of travel of the wheel and others dropped after the wheel has travelled a further distance so that the wheel picks up the particles, carries them toward or in some cases away beyond the top of the wheel and drops them in a shower toward the bottom of the wheel.

Of course this kaleidoscopic effect is enhanced by the fact that the particles are continuously being tumbled about within the wheel, striking against each other and against other teeth as they are dropped from the carrier tooth.

In Figs. 16 and 17 I have diagrammatically illustrated the manner in which the optical system discussed above is effective to magnify or reduce the image of a fixed object upon a fixed screen where the distance between the screen and object always remains the same. Fig. 16 shows a position of maximum magnification, that is, with reciprocally compensating lenses 34 and 33 arranged in close juxtaposition. This view diagrammatically illustrates light rays from the object A, passing through the lens 33 and diverging. Such of these rays as also pass through the lens 33 are directed toward the screen S upon which the image M is projected, the image in this instance being considerably magnified.

Assume however that it is desired to reduce the size of the image, Fig. 17 shows lens 34 moved closer to the object and lens 33 moved closer to the screen where the image is to be projected. Here it will be seen that a less magnified image is produced upon the screen.

Fig. 18 shows an even smaller image produced upon the screen by moving lens 34 still closer to the object and lens 33 still closer to the screen.

In accordance with my invention these reciprocally compensating lenses are automatically actuated toward or away from each other in such fashion that the image is always kept in focus while magnification or demagnification thereof is taking place. It will be obvious by comparison of Figs. 16, 17 and 18, that the range of movement of the lens 33 is much less than the range of movement of the lens 34 and this difference in the relative rate of movement of the lens (whether the lenses be operated by a motor as in the illustrated embodiment of the invention, or be operated by hand) is a matter to be determined by the particular optical characteristics of the two lenses used, it being essential however that the movement of both lenses either toward each other or away from each other, be synchronized and that the relative rates of movement of the lenses be so proportioned that the focus is always maintained.

The diagrammatic showing of Figs. 16 to 18 illustrates a system in which the image may be magnified to approximately three times its original size. By the selection of proper lenses and by providing proper controlling cams to synchronize the movement thereof, greater magnification or diminution may of course be obtained.

In photographic work the advantage of such a lens system will be obvious. For instance in photographing wild animals with a telescopic camera, the use of my improved system will make it possible for the cameraman to obtain the effect of gradually approaching very close to the animal, while in fact the camera remains stationary. For telescopic work, such a system incorporated in a telescope would completely obviate the need for adjusting the eye piece whenever some object in the field of the telescope was to be carefully inspected. That is to say, having found an object in the field which the observer desires to examine very closely, it would merely be necessary to turn a handle or other control element and thereby simultaneously move the reciprocally compensating magnifying lenses without any need for adjusting the eye piece.

In Fig. 17 where only a small area of the lens 34 is effective to transmit light to the lens 33, a smaller image is produced and in Fig. 18 where a lesser portion of the light passing through the lens 34 will be transmitted by the lens 33, the image is still smaller. The point about this is that the intensity of the light which forms the image will be substantially invariant since magnification of the image is accompanied by the use of a greater effective area of the lens 34.

I have disclosed the use of a film having a plurality of pictures thereon which serve as the "images" projected on the screen. It is to be understood however that a suitable illuminated object of any character might be utilized and furthermore that the object may itself be luminous. A typical illustration of this would be the use of a very small neon sign, the image of which would be projected upon the screen.

In lieu of using a circular film I also contemplate the use of slide carriers having windows corresponding to the windows of the present application but with slidably removable outer ends to permit the convenient removal and replacement of individual object members in the frame such for instance as individual films or stencils or other object forming or object carrying devices.

The use of the word "image" in the specification is intended to be very broadly construed since in the case of the telescope there may be no actual surface upon which this image is projected save the surface of the retina of the eye.

While I have not shown it, it will be obvious that the mirror which is used in the present invention might be of the distorting type and might, if desired, be rotated, adding an additional attention compelling factor, namely the distortion of the image on the screen as the latter was being magnified and reduced.

Having thus described my invention, what I claim as new and desire to secure by Letters Patent is:—

1. An apparatus of the class described including a housing, one portion of the wall of which constitutes a screen, a light source disposed within the housing and illuminating screen, a movable object carrying mechanism and a plurality of objects carried thereby, means for actuating said carrier mechanism to successively interpose different objects between the light source and the screen, a lens system arranged between the light source and the screen and including a pair of relatively movable motor driven reciprocally compensating lenses for varying the size of the image while keeping it in focus on the screen.

2. An apparatus of the class described including a housing, one portion of the wall of which constitutes a screen, a light source disposed within the housing and illuminating screen, a movable object carrying mechanism and a plurality of objects carried thereby, means for actuating said carrier mechanism to successively interpose different objects between the light source and the screen, a lens system arranged between the light source and the screen and including a pair of relatively movable reciprocally compensating lenses for varying the size of the image while keeping it in focus on the screen, means for moving the lenses synchronized with the actuating means for the object carrying means.

3. An apparatus of the class described including a housing, one portion of the wall of which constitutes a screen, a light source disposed within the housing and illuminating screen, a movable object carrying mechanism and a plurality of objects carried thereby, means for intermittently actuating said carrier mechanism to successively interpose different objects between the light source and the screen, a lens system arranged between the light source and the screen and including a pair of relatively movable reciprocally compensating lenses for varying the size of the image while keeping it in focus on the screen, lens actuating means and means for synchronizing the object shifting means and the lens actuating means.

4. An apparatus of the class described including a housing, one portion of the wall of which constitutes a screen, a light source disposed within the housing and illuminating screen, a movable object carrying mechanism and a plurality of objects carried thereby, means for intermittently actuating said carrier mechanism to successively interpose different objects between the light source and the screen, a lens system arranged between the light source and the screen and including a pair of relatively movable reciprocally compensating lenses for varying the size of the image while keeping it in focus on the screen, lens actuating means and means for synchronizing the object shifting means and the lens actuating means, said lens actuating means being continuously operated.

5. An apparatus of the class described including a housing, one portion of the wall of which constitutes a screen, a light source disposed within the housing and illuminating screen, a movable object carrying mechanism and a plurality of objects carried thereby, means for intermittently actuating said carrier mechanism to successively interpose different objects between the light source and the screen, a lens system arranged between the light source and the screen and including a pair of relatively movable reciprocally compensating lenses for varying the size of the image while keeping it in focus on the screen, lens actuating means and means for synchronizing the object shifting means and the lens actuating means, said lens actuating means including a continuously running motor for reciprocating the lenses and means controlled from the motor for shifting the object carrier after each complete cycle of movement of the lenses.

6. Apparatus as set forth in claim 5 and wherein intermittently actuating pawl and ratchet mechanism controlled indirectly from the lens actuating mechanism, constitute the carrier shifting means.

7. In an apparatus of the class described a cylinder, means for rotating the cylinder, a pair of lens carriers arranged for axial movement within the cylinder, cam means acting on the lens carriers to cause separation of and advance of the lens carriers by rotation of the cylinder, a light source, an object carrying device, means for intermittently moving the object carrying device to successively interpose different objects between the light source and the lenses, and means for actuating the object carrying device from the cylinder.

8. An apparatus as set forth in claim 7 and including a screen upon which an image is to be projected by the lenses and fixed with respect to the light source and the particular object interposed between said source and the lenses, said lenses being reciprocally compensating to maintain an image of the object continuously in focus on the screen while varying the size of the image.

9. In a display apparatus a screen, a system of relatively movable lenses, an object carrying device and a plurality of objects carried thereby, a light source, said lenses being reciprocally compensating to focus the image of the object on the screen and continuously running motor means for effecting continuous relative movement of the lenses to continuously vary the size of the focussed image and synchronized driving means for the lens and the object carrying member.

HENRY WHITE.